United States Patent
Penaflor

(10) Patent No.: US 10,012,888 B1
(45) Date of Patent: Jul. 3, 2018

(54) OPTICAL LIGHTING ACCESSORY FOR HANDHELD MOBILE DEVICES IN SELFIE MODE

(71) Applicant: Ronaldo Green Penaflor, Fallbrook, CA (US)

(72) Inventor: Ronaldo Green Penaflor, Fallbrook, CA (US)

( * ) Notice: Subject to any disclaimer, the term of this patent is extended or adjusted under 35 U.S.C. 154(b) by 0 days.

(21) Appl. No.: 15/886,845

(22) Filed: Feb. 2, 2018

(51) Int. Cl.
| | |
|---|---|
| *G03B 15/06* | (2006.01) |
| *H04M 1/02* | (2006.01) |
| *G03B 17/56* | (2006.01) |

(52) U.S. Cl.
CPC ......... *G03B 15/06* (2013.01); *G03B 17/565* (2013.01); *H04M 1/0202* (2013.01)

(58) Field of Classification Search
CPC .... G03B 15/06; G03B 17/565; H04M 1/0202
See application file for complete search history.

(56) References Cited

U.S. PATENT DOCUMENTS

| | | |
|---|---|---|
| 8,428,644 B1 | 4/2013 | Harooni |
| 9,316,539 B1 * | 4/2016 | Phua ..................... G01J 3/0256 |
| 9,442,346 B2 | 9/2016 | Gantz |
| 9,464,796 B2 | 10/2016 | Shoemake |
| 2016/0209025 A1 | 7/2016 | Matthews |
| 2016/0296111 A1 | 10/2016 | Russo |
| 2017/0026499 A1 | 1/2017 | Gifford |
| 2017/0324438 A1 | 11/2017 | Mischel |

FOREIGN PATENT DOCUMENTS

WO    WO2017/025832    2/2017

* cited by examiner

*Primary Examiner* — David V Bruce

(57) ABSTRACT

An optical lighting accessory is described for use with a handheld mobile device in photography or videography applications. The handheld mobile device includes at least a front-facing camera and light source. The optical lighting accessory includes 1) an optical element, the optical element configured to receive and capture a plurality of light rays from the light source of the handheld mobile device, 2) a light receiver panel for transforming the light source into a diffused lighting, and 3) a pair of attachment members or accessory case coupled to the light receiver panel, the pair attachment members or accessory case are configured to receive and fasten to the handheld mobile device, and a diffuser layer of the light receiver panel is configured to provide the diffused light to the front-facing camera.

20 Claims, 14 Drawing Sheets

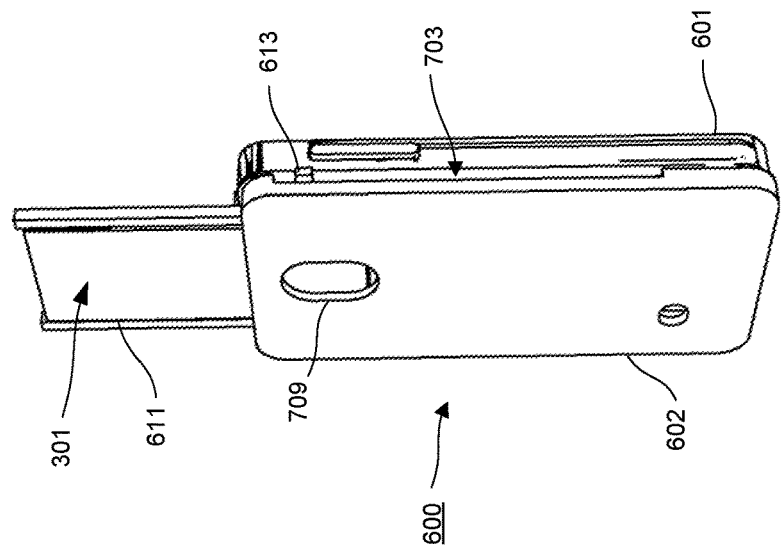
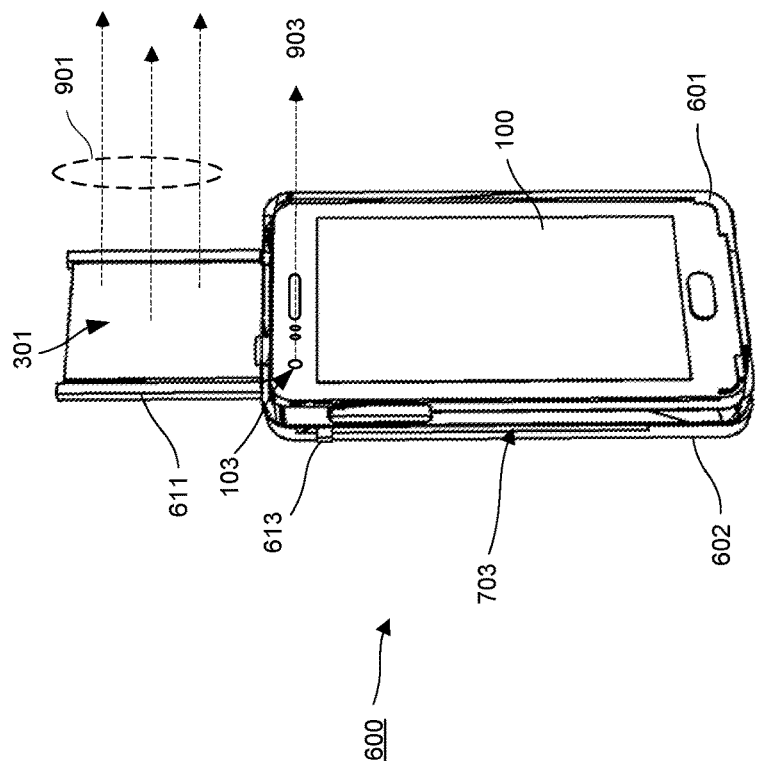
FIG. 9B
FIG. 9A

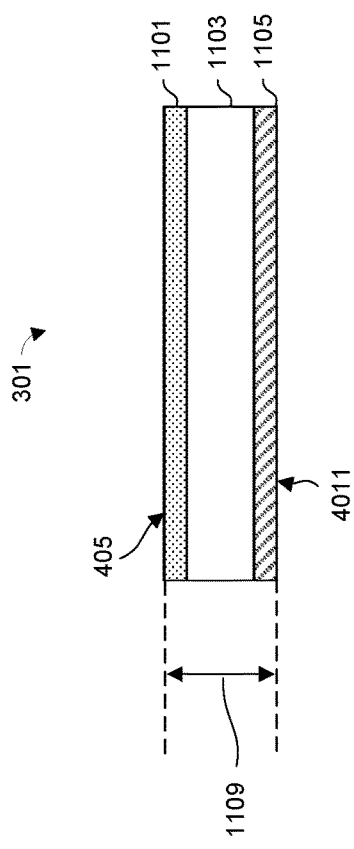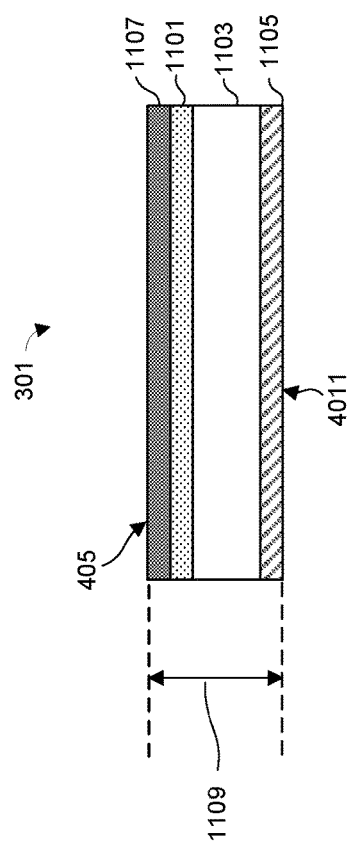

OPTICAL LIGHTING ACCESSORY FOR HANDHELD MOBILE DEVICES IN SELFIE MODE

FIELD OF THE INVENTION

The present invention relates to an optical lighting accessory for smartphones or portable handheld mobile devices used in photography or videography. Particularly, the optical lighting accessory expands the lighting capabilities of the smartphone or portable handheld mobile device in selfie mode for handheld mobile devices having a front-facing camera and backside flash.

BACKGROUND

The popularity of social media has increased over the years and has made handheld portable phones a powerful communication and multimedia tool with powerful camera capabilities used in both photography and videography application. Current handheld portable devices such as smartphones and handheld mobile phones are equipped with sophisticated cameras (rear and front-facing) and a front facing touchscreen display screen for viewing live images to capture in either video mode or photography mode. A self-portrait photograph or "selfie" is accomplished by a user using the front-facing camera of the smartphone and directing the camera facing the user, while holding the smartphone in the hand at arm's length or supported by a selfie stick.

When capturing images, daylight conditions or areas that are adequately lit with artificial lighting provide the necessary lighting to capture subject at adequate exposure levels. However, in dark or poorly lit conditions, additional lighting is a necessity to provide the fill-in lighting or flash needed to capture the subject at the desired exposure levels. Most smartphones today are only equipped with a single flash making it difficult, if not impossible, to take selfies at night or in poorly lit areas. To address these sorts of lighting issues of taking selfies in poor lighting conditions, several lighting products have emerged in the marketplace including, for example, LED fill flash clips, ring-light flash, and cases with built-in LED lighting.

One such illumination apparatus for taking selfies on mobile devices is exemplified by U.S. Pat. No. 9,464,796, incorporated by reference herein in its entirety. This application generally teaches an illumination device generally that has a light source and an attachment assembly that connects the light source to the computing device. Another such lighting device apparatus for mobile devices is exemplified by U.S. Patent Application Publication No. US20170324438, incorporated by reference herein in its entirety. This application generally teaches a mobile device case, such as for a mobile phone, which has lighted panels that fold inwardly from an edge of the case. Yet another such lighting device apparatus for mobile devices is exemplified by U.S. Patent Application Publication No. US20160209025, incorporated by reference herein in its entirety. This application generally teaches a lighting device attachment for a mobile device having a housing that defines a cavity or an external coupling member configured to receive the mobile device, a light source within the housing, and an optical element adapted to project light from the light source to illuminate an external scene. The above patent documents generally discuss external lighting devices having external light sources and power sources that require electrical components to power and control the lighting devices such as an secondary LED flash.

One type of optical accessory for mobile devices is exemplified by U.S. Patent Application Publication No. US20170026499, incorporated by reference herein in its entirety. This application generally describes an attachment for use with a mobile device with an imaging device or with a case for the mobile device, and in particular to a system for scanning a barcode using a smartphone and other mobile devices. Another type of optical accessory for mobile devices is exemplified by U.S. Patent Application Publication No. US 20160296111, incorporated by reference herein in its entirety. This application generally teaches an optical accessory, which can be associated with a mobile device such as a smartphone or tablet, and in particular the optical accessory comprises coupling means to be functionally attached to the mobile device thereby substantially forming an opthalmoscope.

Various illumination and flash fill devices for taking selfies using handheld mobile devices such as smartphones are known in the art as presented hereinabove, requiring electronic components and different in form and function from the present disclosure. Similarly, optical accessories for mobile devices do exist in various fields, but they are more complex in function and mechanically different than the present disclosure, and do not provide any novel solutions to the front-side illumination problems described by the present disclosure.

SUMMARY

It is an advantage of the present invention to provide an optical lighting accessory for use with a handheld mobile device having a front side, a backside, a front-facing camera formed on the front side, a display formed on the front side, and a light source formed on the backside, the optical lighting accessory including an optical element, the optical element configured to receive, capture and communicate a plurality of light rays emitted by the light source of the handheld mobile device; a light receiver panel having a front side, a backside, a top portion, a base and two side portions, the base of the light receiver panel is coupled to the optical element and configured to receive the plurality of light rays communicated by the optical element, the front side of the light receiver panel includes a diffuser layer for transforming the plurality of light rays into a diffused light, and the backside of the light receiver panel includes a reflector layer for reflecting the plurality of light rays to the diffuser layer; and a pair of attachment members coupled to the side portions of the light receiver panel, the pair attachment members are configured to receive and fasten to the handheld mobile device, and the diffuser layer of the light receiver panel is configured to provide the diffused light to the front-facing camera.

It is another advantage of the present invention to provide an optical lighting accessory for use with a handheld mobile device having a front side, a backside, a front-facing camera formed on the front side, a display formed on the front side, and a light source formed on the backside, the optical lighting accessory including an optical element, the optical element configured to receive, capture and communicate a plurality of light rays emitted by the light source of the handheld mobile device; a light receiver panel having a front side, a backside, a top portion, a base and two side portions, the base of the light receiver panel is coupled to the optical element and configured to receive the plurality of light rays communicated by the optical element, the front side of the light receiver panel includes a diffuser layer for transforming the plurality of light rays into a diffused light, and the backside of the light receiver panel includes a reflector layer for reflecting the plurality of light rays to the diffuser layer; and an accessory case configured to couple the optical element and the light receiver panel to the handheld mobile device, the diffuser layer of the light receiver panel is configured to provide the diffused light to the front-facing camera to the handheld mobile device.

In another embodiment, the optical lighting accessory may include an accessory case configured to couple the optical element and the light receiver panel to the handheld mobile device.

In yet another embodiment, the optical element may be structured to reflect the plurality of light rays by about 90 degrees.

In another embodiment, the optical element is a prism or mirror.

It still yet another embodiment, the optical lighting accessory may include a vanity mirror coupled to the reflector layer of the light receiver panel.

In one aspect, the handheld mobile device may include a variety of devices including, but not limited to, a smartphone, a tablet, a laptop or a portable mobile computing device.

In another aspect, optical lighting accessory may include a light intake element coupling the light receiver panel to the optical element. In still another aspect, the light intake element is an optical light pipe, an optical light guide, an optical light funnel, or a fiber optic cable.

In one application, the optical lighting accessory may provide the diffused light to the front-facing camera when the handheld mobile device is in selfie mode.

In one embodiment, the light receiver panel may include a color filter layer for altering the color of the plurality of light rays.

In another embodiment, the light receiver panel may include a plurality of reflective strips coupled to the top portion, a portion of the base and the two side portions of the light receiver panel.

In yet another embodiment, the optical lighting accessory may have an optical housing element for covering a portion of the optical element for purpose of restricting light to the optical components and preventing from escaping from the optical housing element.

In another embodiment, the optical element and the light receiver panel may be fastened to a retractable light panel carrier, the accessory case comprising a plurality support edges in which the retractable light panel carrier may freely slide.

In one aspect and advantage, the novel optical lighting accessory provides diffused light to the front-facing camera without the use of electronic parts, power supply or additional lighting components, and only uses the existing hardware and light source provided by the handheld mobile device.

In another aspect and advantage, the optical lighting accessory is simple in construction and design, using a minimal set of hardware components and basic set of optical components (mirrors, prisms, filters, and diffusers).

In another embodiment, the novel optical lighting accessory apparatus only includes simple optical components, light-guides, mounting components, and uses the existing hardware and flash lighting already provided on the smartphone, making this less expensive and simple to manufacture, and advantageous and a key distinction over conventional fill-in flash devices or other optical accessories.

Other advantages of the novel optical lighting accessory apparatus include 1) easy and flexible attachment to the smartphone, 2) slim profile, light-weight, compact and portable to carry, 3) versatile and configured to fit many different types of mobile device bodies and cases.

These and other objects, features and advantages of the present invention will become more apparent in light of the following detailed description of preferred embodiments thereof, as illustrated in the accompanying drawings.

BRIEF DESCRIPTION OF THE DRAWINGS

The present invention will be more clearly understood from the following detailed description of the preferred embodiments of the invention and from the attached drawings, in which:

FIG. 9A and FIG. 9B illustrate perspective views of a typical implementation of the optical lighting accessory with accessory case used with the handheld mobile device, in accordance to an embodiment.

FIG. 11A and FIG. 11B illustrate cross-sectional views of two types of layer stacking configurations of the light receiver panel included in the optical lighting accessory, in accordance with an embodiment.

In the appended figures, one or more elements may have the same reference numeral in different figures indicating previously described elements.

DETAILED DESCRIPTION

Embodiments in this disclosure include a novel optical lighting accessory apparatus and solution for handheld mobile devices to provide diffused lighting (fill-in flash) to the front-side camera without the use or need of additional external power sources or electronic components. Some of these handheld mobile devices include, for example, smartphones, tablets, computing notebooks, personal digital assistance (PDA) and the like that are equipped with a front-facing camera and flash. In practice, the novel flash attachment accessory apparatus includes an attachment that is attached the body of the smartphone and a light guide/reflector panel to provide fill-in flash lighting in poorly lit environments when a user performs a self-photograph in selfie mode using the front-facing camera of the smartphone.

Unlike the conventional fill-in flash devices which require a rechargeable power source and electrical components to provide the necessary front-side lighting to take selfie photographs, the novel optical lighting accessory apparatus only includes simple optical components, light-guides, mounting components, and uses the existing hardware and flash lighting already provided on the smartphone, making this less expensive and simple to manufacture, and advantageous and a key distinction over conventional fill-in flash devices or other optical accessories. Other advantages of the novel optical lighting accessory apparatus include 1) easy and flexible attachment to the smartphone, 2) light-weight, compact and portable to carry, 3) may be integrated into a case that also holds the smartphone, and 4) versatile and configured to fit many different smartphone bodies and cases.

Figure 1B:
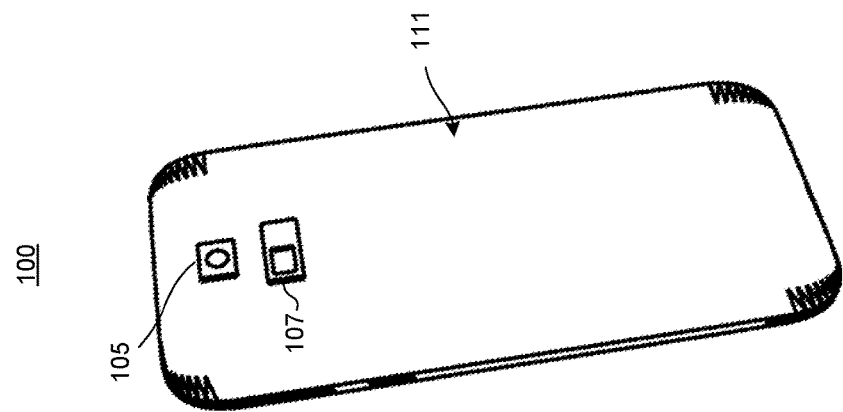
FIG. 1A and FIG. 1B illustrates a front and a rear perspective views, respectively, of a generic handheld mobile device having built-in camera.
Figure 1A:
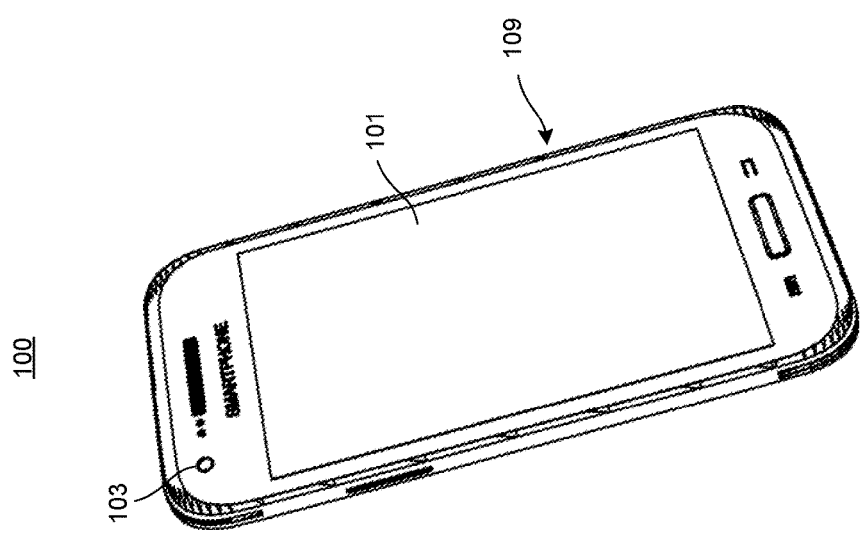

FIG. 1A and FIG. 1B illustrates front and rear perspective views, respectively, of a generic handheld mobile device (e.g., smartphone) 100 having built-in camera. As shown in front side view in FIG. 1A, the handheld mobile device 100 includes a touchscreen display 101 for viewing text, graphics, and video, as well as providing input and making selections to various mobile applications ("apps") which are installed on the mobile device. The handheld mobile device 100 device also includes a front-side camera 103 located near the top of the mobile device for taking photographs or video while a user is facing the touchscreen display 101. In FIG. 1B, the backside of the handheld mobile device 100 is shown and includes a rear camera 105 (typically higher in resolution than the front-facing camera) and a light source (LED flash) 107. As used throughout this document and for reference and identification purposes, the front facing side 109 of the handheld mobile device 100 is identified in FIG. 1A and includes the display and front-facing camera. Similarly, the rear facing side 111 of the smartphone 100 is identified in FIG. 1B and includes the LED flash 107 and rear camera 105.

Figure 2:
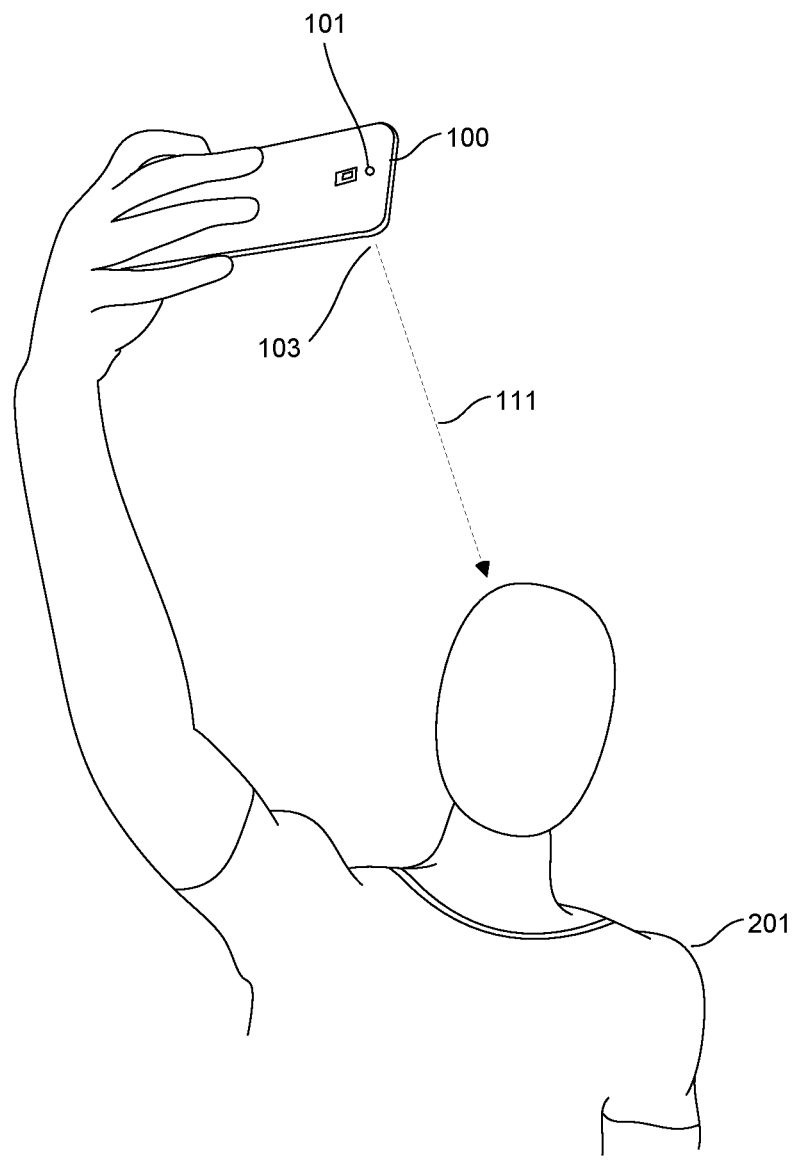
FIG. 2 illustrates an example of a self-portrait photograph or "selfie" by user using the handheld mobile device.

FIG. 2 illustrates an example of a self-portrait photograph or "selfie" by user 201 using the handheld mobile device 100. In this example, the selfie is accomplished by the user 201 using the front-facing camera 103 (not visible) and directing it along path 203 so that it is facing the user 201, while holding the handheld mobile device 100 in the hand at arm's length. Ideal lighting conditions for taking selfies using the front-facing camera 103 may include, for example, outdoors during the daytime, indoors with artificial lighting, or the use external electronic accessory devices that provide flash fill-in lighting.

Figures 3A, 3B:
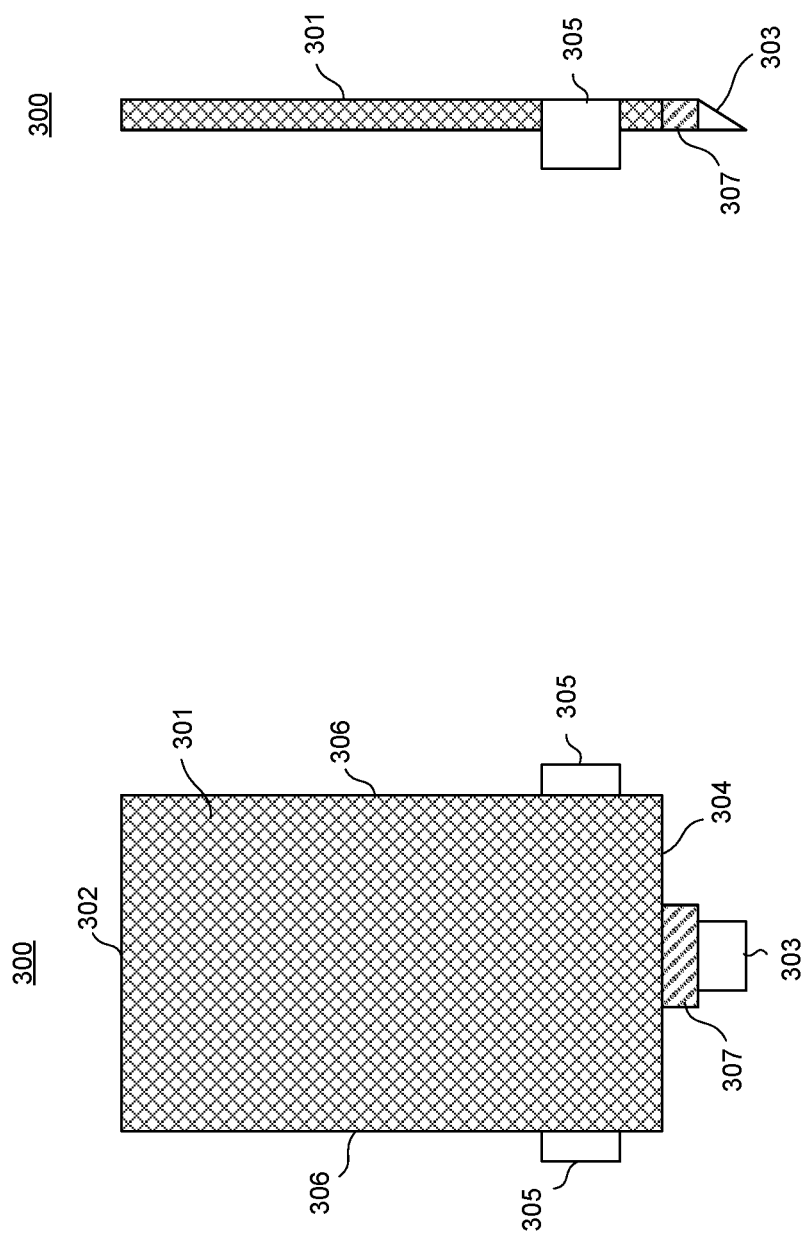
FIG. 3A and FIG. 3B illustrate a front and a side view, respectively, of an optical lighting accessory for providing fill-in lighting while using the front-facing camera of the handheld mobile device, in accordance with an embodiment.

FIG. 3A and FIG. 3B illustrate a front and a side view, respectively, of a novel optical lighting accessory 300 for providing a diffused light (fill-in lighting) to the front-facing camera 103 of the handheld mobile device 100, in accordance with an embodiment. The optical lighting accessory 300 includes, for example, a light receiver panel 301 having a top portion 302, a base 304 and two side portions 306; an optical element 303 coupled to the base 304 of the light receiver panel 301; and a pair of attachment members 305 coupled to the side members 306 of the light receiver panel 301. Optical members of the optical lighting accessory 300 may be configured to redirect the light rays from a primary light source (e.g., LED flash 107) and convert the light rays into a diffused and uniform state. To redirect the light rays, the optical element 303 may have certain structural properties that redirect light rays through internal reflection or direct reflection by an angle of about 90 degrees. Examples of some optical elements 303 with such reflection properties may include right angle prisms, right angle mirrors, reflectors, and the like. The light receiver panel 301 may be configured to include a light intake element 307 and diffuser panel (not shown), diffusing and uniformly dispersing it over a planar transparent surface. These and other optical members, structure and various embodiments of the light receiver panel 301 are provided later herein below.

Figure 4:
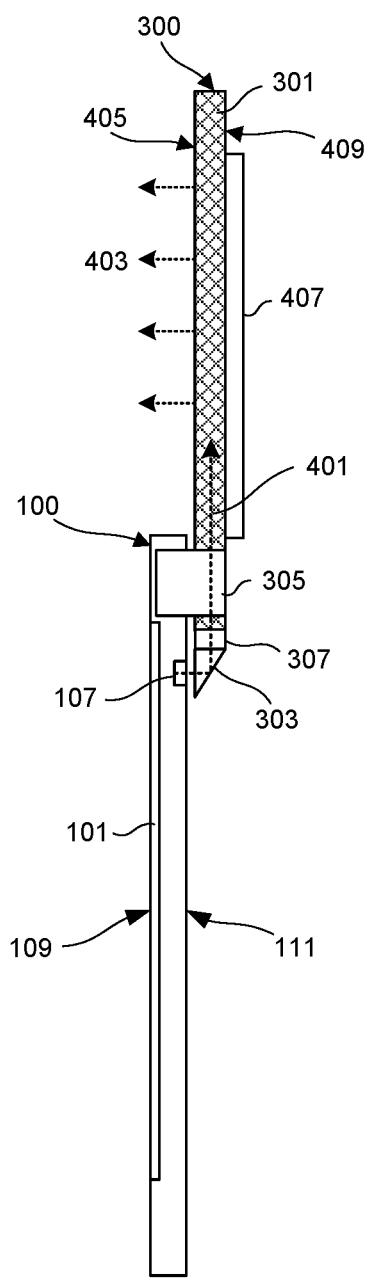
FIG. 4 illustrates a side view of the optical lighting accessory attached to the smartphone, in accordance with an embodiment.

FIG. 4 illustrates a side view of the optical lighting accessory 300 attached to the handheld mobile device 100 in accordance with an embodiment. Attachment members 305 of the optical lighting accessory 300 may be attached to the top of the handheld mobile device 100 using clips, fitted tabs, clamps, non-slip grips, and the like. In practice, the optical lighting accessory 300 may be attached to the smartphone 100 so that the optical element 303 completely covers the LED flash 107. Upon enabling the LED flash 107, light from LED flash 107 is transmitted to the optical element 303 which in turn redirects the light along light path 401 (via a 90 degree shift in direction) to the light intake element 307 formed at the base 304 of the light receiver panel 301. Light, from the LED flash 107, upon entering the light receiver panel 301 along light path 401, is reflected from a diffused surface (not shown) formed in the light receiver panel 301 such that light rays incident on the diffused surface is scattered at many angles, creating diffused lighting 403 on a light output side 405 of the light receiver panel 301. Optionally, a vanity mirror 407 may be coupled to an opaque side 409 of the light receiver panel 301 for providing additional structural support to the light receiver panel 301 as well for self-grooming purposes.

Figure 5:
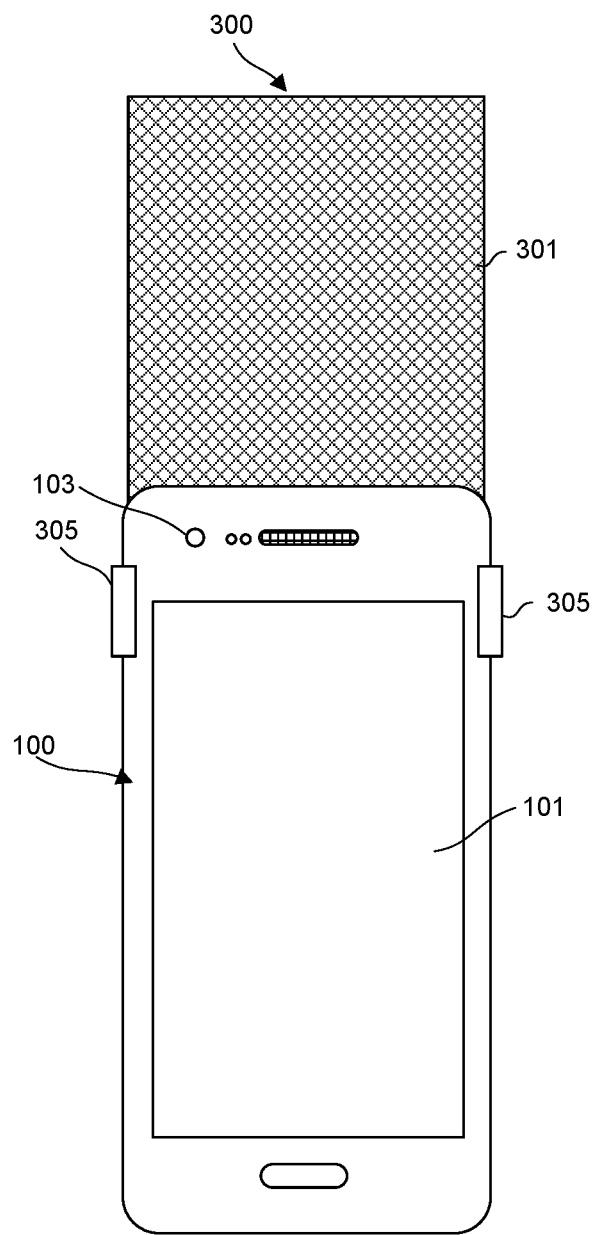
FIG. 5 illustrates a front view of the optical lighting accessory attached to the handheld mobile device, in accordance with an embodiment.

FIG. 5 illustrates a front view of the optical lighting accessory 300 attached to the handheld mobile device 100. This illustration presents the general size, shape and location of the light receiver panel 301 and attachment members 305 of the optical lighting accessory 300 relative the front-side camera 103 and the touchscreen display 101 of the handheld mobile device 100, in accordance with an embodiment.

Figure 6A:
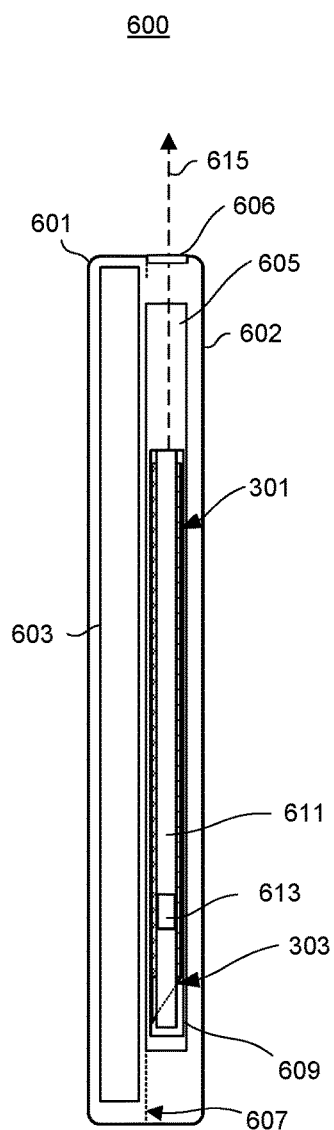
FIG. 6A and FIG. 6B illustrate two side views of another optical lighting accessory, in accordance with an embodiment.
Figure 6B:
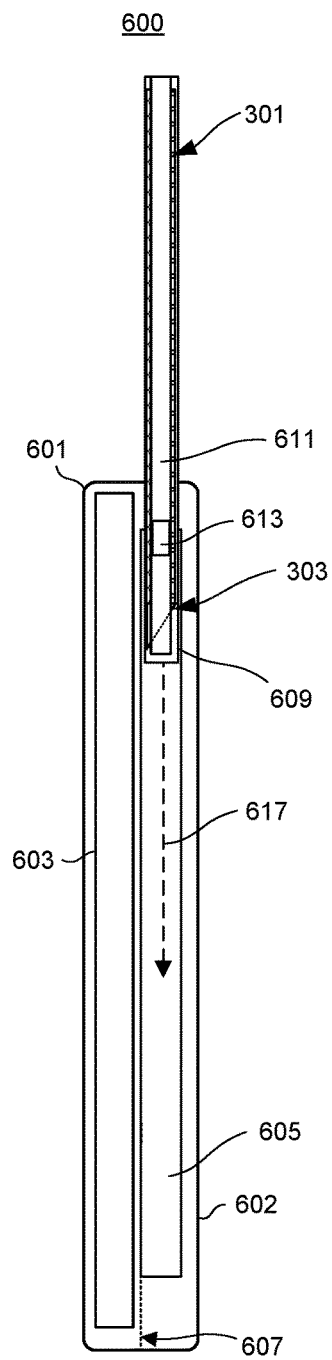

FIG. 6A and FIG. 6B illustrate two side views of an embodiment of another optical lighting accessory 600. In FIG. 6A, the optical lighting accessory 600 may include the same light receiver panel 301 and the optical element 303 as shown and described in the previous embodiment. And, instead of the pair of attachment members 305, the optical lighting accessory 600 may include an accessory case (601, 602) having a first detachable case member 601 and a second detachable case member 602, the first detachable case member 601 and the second detachable case member 602 capable of being detached and separated at interface 607. Furthermore, the accessory case may be configured to 1) integrate and support the light receiver panel 301 and the optical element 303 into the interior of the accessory case (601, 602), and 2) receive and secure the handheld mobile device 100 at a phone receiving cavity 603 located on the first detachable case member 601 of the accessory case (601, 602). The optical lighting accessory 600 may also include a retractable light panel carrier 609 located in a panel height adjuster slot 605 formed between the first detachable case member 601 and the second detachable case member 602. The retractable light panel carrier 609 having two vertical rail members 611 that are configured to 1) receive, support and fasten to the light receiver panel 301 and the optical element 303, and 2) vertically slide within the panel height adjuster slot 605 formed in one side portion of the second detachable case member 602. In addition, a panel height adjuster bar 613 may be attached to a bottom portion of one of the vertical rail members 611. In operation, the optical lighting accessory 600 generally has two position settings: 1) closed (down) and 2) open (up). FIG. 6A illustrates the closed position setting where the retractable light panel carrier 609 is fully retracted to the downward position (i.e., fully enclosed in the accessory case). By manually moving the panel height adjuster bar 613 upward (i.e., in the direction of arrow of dashed line 615) from the closed position, the light panel carrier 609 may be fully extended through an narrow slot 606 located on top of the second detachable case member 602 to the open position as shown in FIG. 6B. In the open position setting shown in FIG. 6B, the light panel carrier 609 is fully extended with the light receiver panel 301 and the optical element 303 at the top position, and the optical element 303 is in complete alignment with the opening of the light source (LED flash) 107 of the handheld mobile device 100. From the opening position shown in FIG. 6B, manually moving the panel height adjuster bar 613 downward (i.e., in the direction of arrow of dashed line 617) from the open position, the light panel carrier 609 may be fully retracted through the narrow slot 606 back to its original closed position as shown in FIG. 6A.

Figure 7:
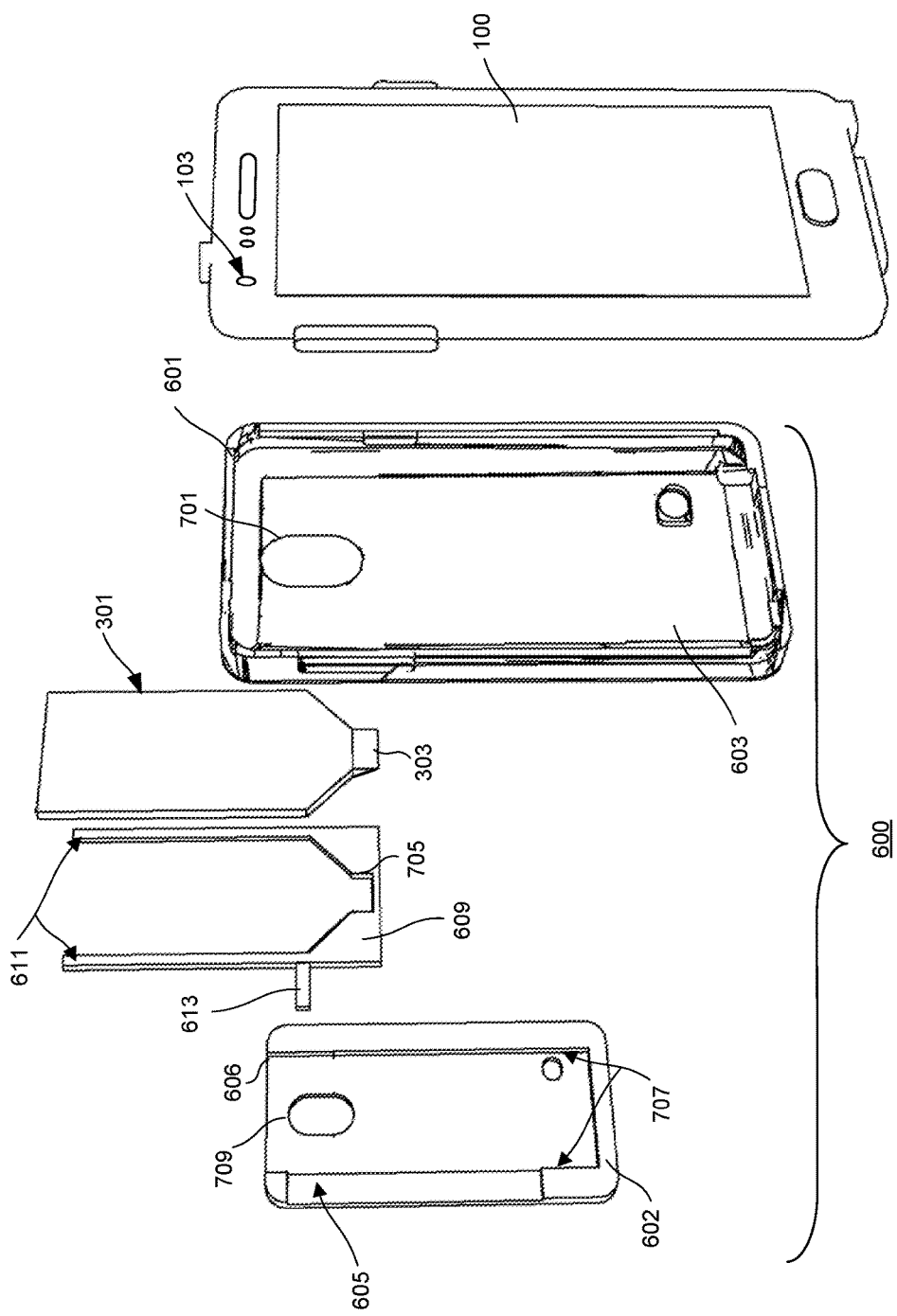
FIG. 7 illustrates an exploded perspective view of several components of the accessory case associated with the optical lighting accessory including the handheld mobile device, in accordance to an embodiment.

FIG. 7 illustrates an exploded perspective view of several components of the accessory case associated with the optical lighting accessory 600 including the handheld mobile device 100, in accordance to an embodiment. In this illustration, several other features of individual elements associated with the accessory case (601, 602) and light panel carrier 609 are now visible. For example, in FIG. 7, a camera and light source opening 701 is included in the first detachable case member 601, allowing the light rays generated by the light source 107 to pass through to the optical element 303 at the open position. In another example, the light panel carrier 609 may also include an optical slot 705 that matches the shape of both the light receiver panel 301 and the optical element 303. In yet another example, the second detachable case member 602 may include rail support edges 707 in which the light panel carrier 609 may freely slide. The second detachable case member 602 may also include a rear camera and light source opening 709, allowing the rear camera and flash visible of the handheld mobile device access when the optical lighting accessory 600 is in the closed position.

Figure 8B:
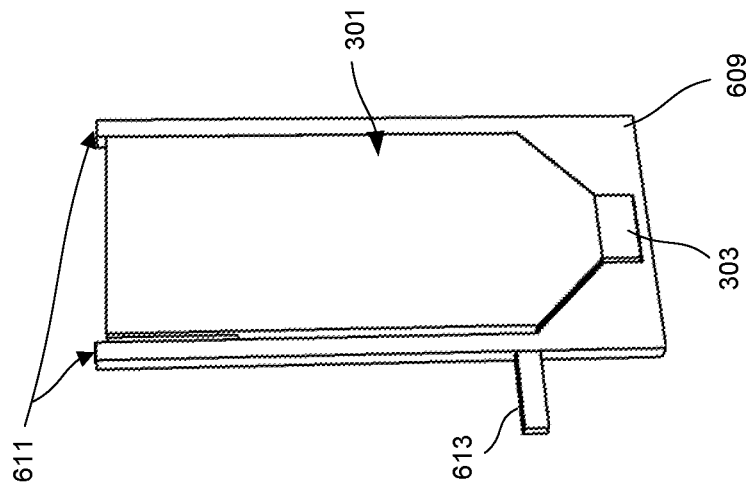
FIG. 8A and FIG. 8B illustrate perspective views of the light panel carrier and the light receiver panel 301 and the optical element, in accordance with an embodiment.
Figure 8A:
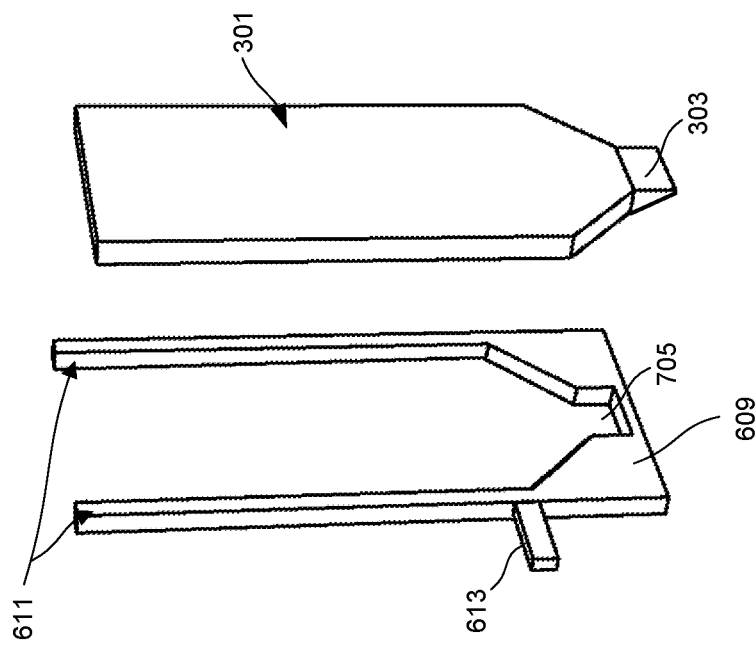

FIG. 8A and FIG. 8B illustrate perspective views of the light panel carrier 609 and the light receiver panel 301 and the optical element 303. FIG. 8A demonstrates the light panel carrier 609 separated from the light receiver panel 301 and the optical element 303 while FIG. 8B demonstrates the light receiver panel 301 and the optical element 303 inserted into light panel carrier 609. In one aspect and advantage, the light receiver panel 301 and the optical element 303 are easily removed from the light panel carrier 609 and are interchangeable with replacement parts or other types light receiver panels, including those with filters.

FIG. 9A and FIG. 9B illustrate perspective views of a typical implementation of the optical lighting accessory 600 with accessory case (601, 602) used with the handheld mobile device 100, in accordance to an embodiment. FIG. 9A depicts the front side of the optical lighting accessory 600, accessory case (601, 602), and handheld mobile device 100 with the optical lighting accessory in full open position. In this mode, a substantial portion of the light receiver panel 301 is situated above the accessory case (601, 602). In operation, light rays from the light source 107 (not visible) located on the backside of the handheld mobile device 100, when activated, is redirected to the light receiver panel 301, producing a diffused light 901 that is projected substantially toward the same direction 903 of the front-side camera 103. FIG. 9B depicts the backside of the optical lighting accessory 600, accessory case (601, 602), and handheld mobile device 100 with the optical lighting accessory in full open position. In FIG. 9B, the rear camera and light source opening 709 are covered by a portion of the light receiver panel 301 and the optical element 303 (not visible) when the optical lighting accessory is in full open position.

Figure 10B:
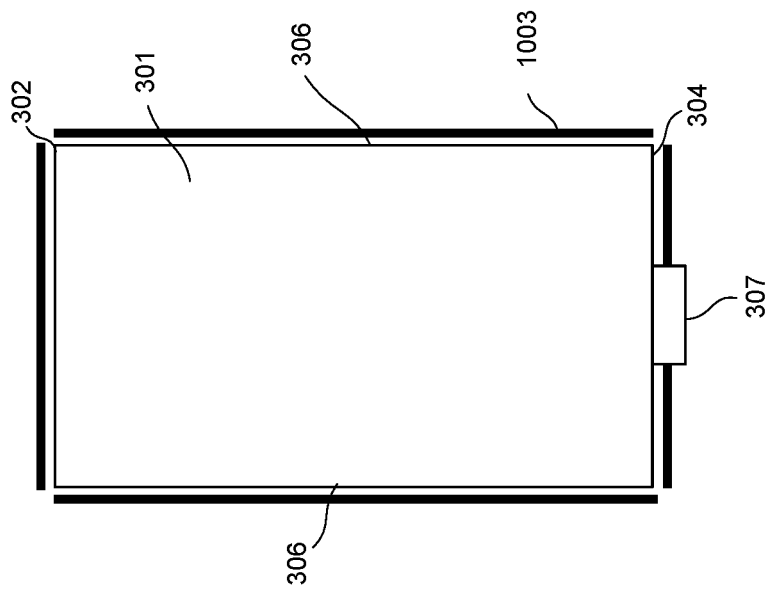
FIG. 10A and FIG. 10B illustrate a front perspective view and a front view, respectively, of the light receiver panel included in the optical lighting accessory, in accordance with an embodiment.
Figure 10A:
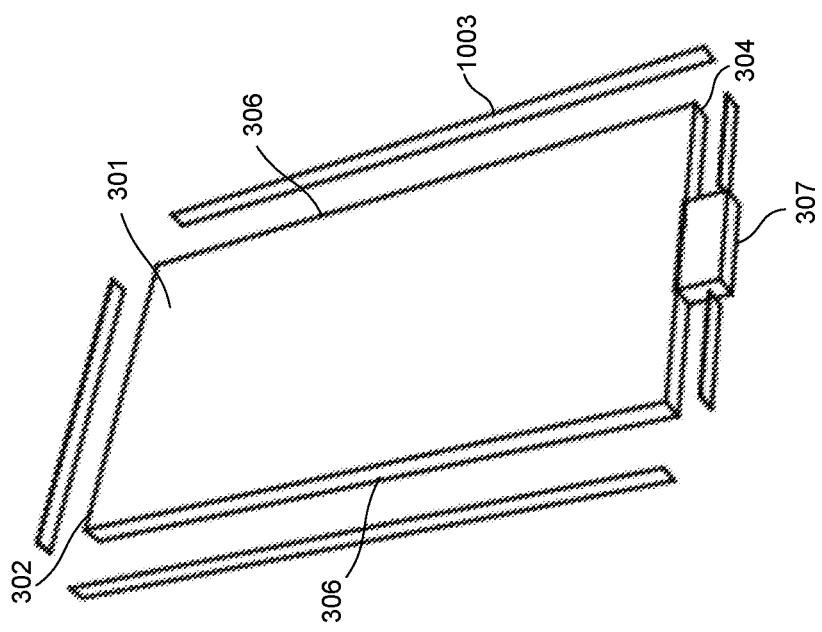

In another embodiment, FIG. 10A and FIG. 10B illustrate a front perspective view and a front view, respectively, of the light receiver panel 301 included in the optical lighting accessory 300. The light receiver panel 301 may include opaque or reflective strips 1003 attached or formed along the top portion 302, two sections of the base 304, and two side 306 edges of the light receiver panel 301 to prevent light from escaping along the peripheral edges of the light receiver panel 301. An unexposed strip area along the base 304 is reserved for the light intake element 307 which is coupled to the base 304 of the light receiver panel 301. Some examples of the light intake element 307 include optical light pipes, optical light guides, optical light funnels, and fiber optic cables.

In yet another embodiment, FIG. 11A and FIG. 11B illustrate cross-sectional views of two types of layer stacking configurations of the light receiver panel 301 included in the optical lighting accessory 300. In a first stacking configuration shown in FIG. 11A, the light receiver panel 301 may include a diffuser layer 1101, a transparent layer 1103, and a reflector (or opaque layer) 1105 in which the transparent layer 1103 is sandwiched between the diffuser layer 1101 and the reflector layer 1105. With respect to the optical lighting accessory 300, the light output side 405 which outputs the diffused lighting 403 is formed on the outer side (exposed side) of the diffuser layer 1101, while the opaque side 409 is defined by the reflector layer 905. In a second stacking configuration shown in FIG. 11B, the light receiver panel 301 may include an optional filter layer 1107 in addition to the diffuser layer 1101, the transparent layer 1103, and the reflector 1105 described hereinabove. The filter layer 1107 may include color filters, polarizing filters, black light filters, or other optical filters that may enhance or add special effects to the output of the diffused lighting 403. With reference to the optical lighting accessory 300, the light output side 405 is formed on the outer side (exposed side) of the filter layer 1107, while the opaque side 409 is defined by the reflector layer 1105. In view of some practical implementations in photography and video applications, the combined stacked depth 1109 of the diffuser layer 1101, the transparent layer 1103, the reflector 1105 and optional filter 1107 may be about 3 mm-16 mm in total thickness.

Figure 12C:
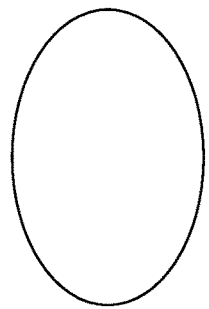
FIG. 12A-FIG. 12F illustrate various shapes and types of the light receiver panel implementations of the optical lighting accessory, in accordance to an embodiment.
Figure 12B:
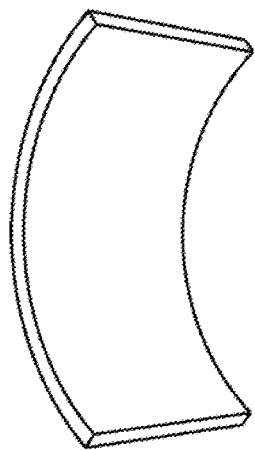
Figure 12A:
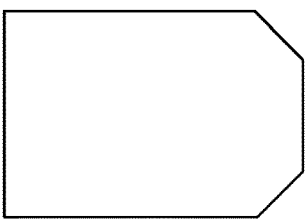
Figure 12F:
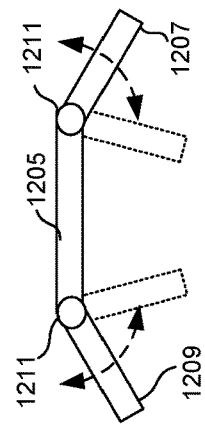
Figure 12E:
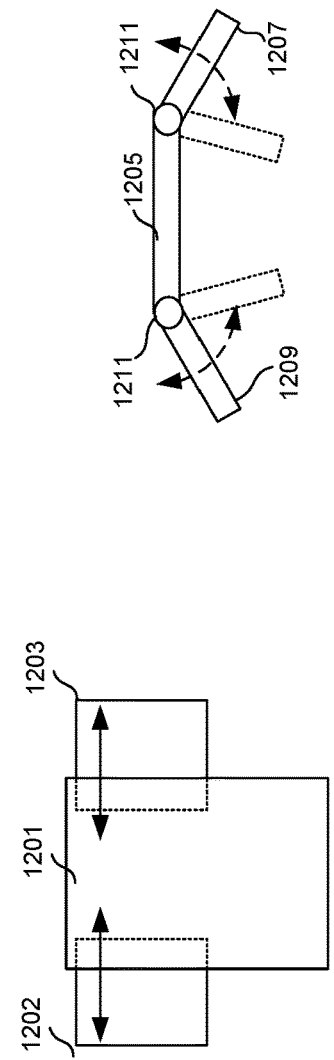
Figure 12D:
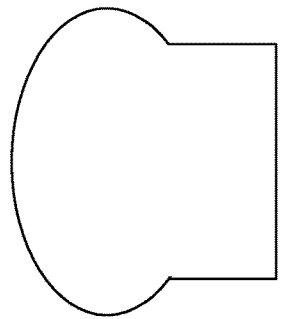

FIG. 12A-FIG. 12F illustrate various shapes and types of the light receiver panel 301 implementations of the optical lighting accessory 300 in accordance to another embodiment. Various shapes of the light receiver panel 301 may include, for example, a polygon shaped panel as shown in FIG. 12A, a curved shaped panel as shown in FIG. 12B, an oval shaped panel as shown in FIG. 12C, or a combination of polygon and curved shaped panel as shown in FIG. 12D.

In another implementation, the light receiver panel 301 may include multiple sliding panels (1202, 1203) in which two sliding panels (1202, 1203) are configured to retract and extend outward beyond a fixed panel 1201 along the horizontal direction as shown in FIG. 12E. In yet another embodiment, the light receiver panel 301 may include multiple rotatable panels (1207, 1209) in which two rotatable panels (1207, 1209) are configured to rotate clockwise and counterclockwise along hinges 1211 coupling the two rotatable panels (1207, 1209) to a fixed panel 1205 as shown in a top view of FIG. 10F.

Figure 13C:
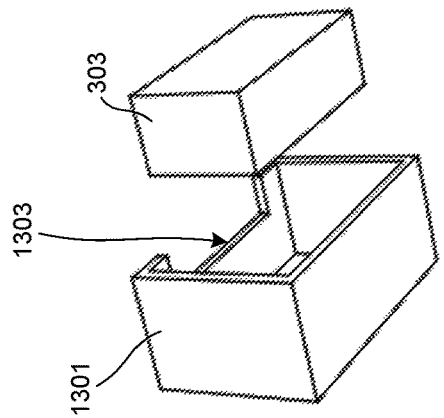
FIG. 13A-FIG. 13C illustrate multiple views of an optional optical housing element enclosing the optical element of the optical lighting accessory, in accordance with an embodiment.
Figure 13B:
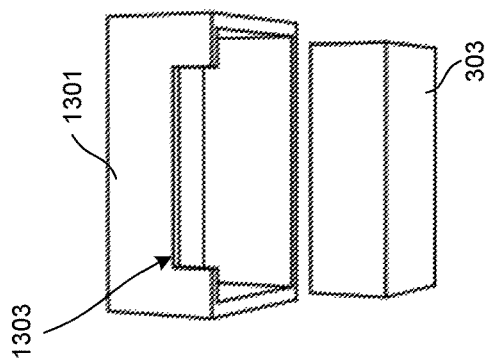
Figure 13A:
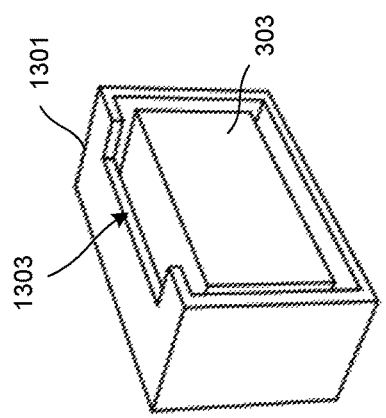

FIG. 13A-FIG. 13C illustrate multiple perspective views of an optional optical housing element 1101 enclosing the optical element 303 of the optical lighting accessory 300. These perspective views include a front left side view in FIG. 13A, a front top view in FIG. 13B, and a bottom left side view in FIG. 13C. In practice, the optional optical housing element 1301 is structured to enclose both the optical element 303 and the LED flash 107 which may help contain the input light rays and reduce and prevent light leakage or light loss from the light source emanating at the LED flash 107 and the optical element 303. A light slot 1303 is also provided on the optical housing element 1301 to allow a light path to the light intake element 307 of the light receiver panel 301.

Figure 14:
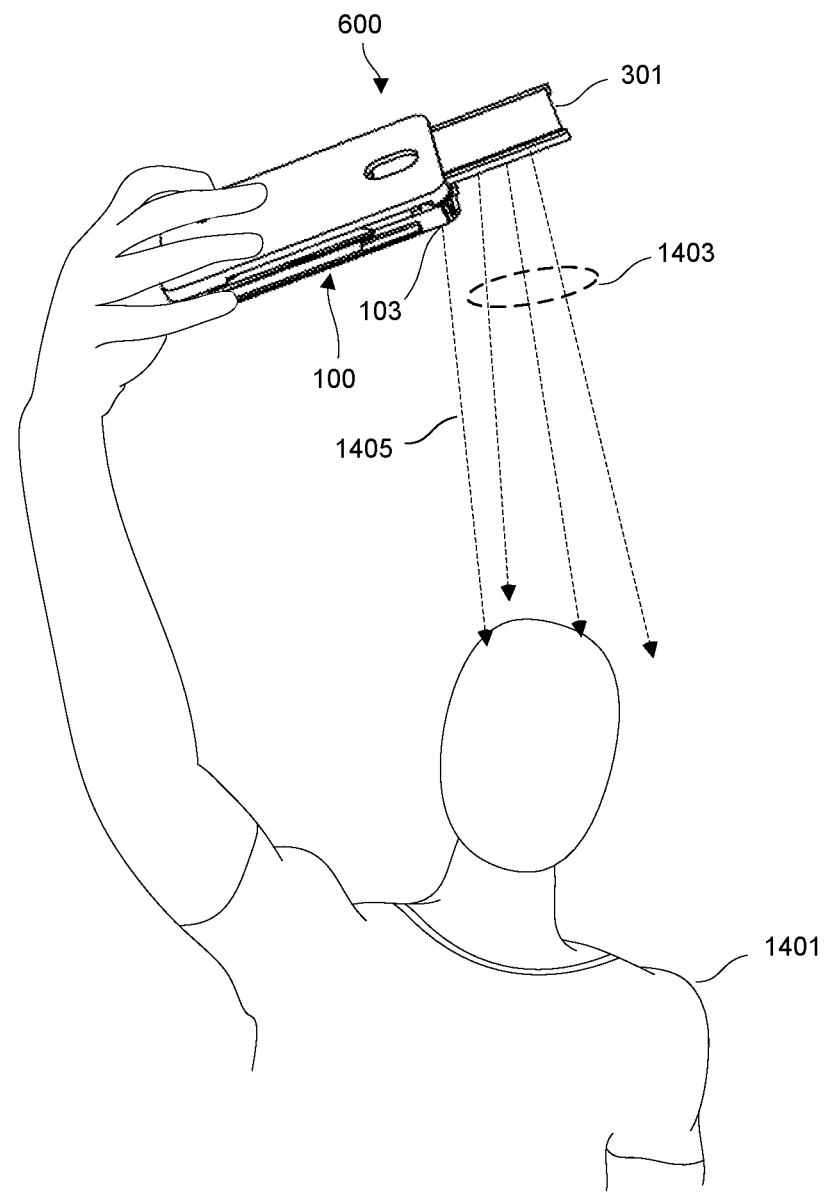
FIG. 14 illustrates an implementation of the optical lighting accessory attached to the handheld mobile device while a user is taking a photograph or video in selfie mode, in accordance with an embodiment.

FIG. 14 illustrates a basic implementation of the optical lighting accessory 600 attached to the handheld mobile device 100 while a user 1401 is taking a photograph or video in "selfie" mode. In this example, a diffused light (fill-in lighting) 1403 formed by the diffuser layer 1101 of the light receiver panel 301 is projected toward the user 1401 by the optical lighting accessory 600 when the LED flash 107 is enabled on the handheld mobile device 100, providing adequate diffused lighting and exposure to the front-facing camera 103 pointing in the direction 1405 that is facing the user 1401.

The optical lighting accessory may be constructed to meet different requirements affecting functional performance metrics, visual appeal, cost, and durability. For example, to provide adequate fill-in lighting in photography and video applications, depending on the application and use by the user 1401, different sizes of light receiver panel 301 may be implemented which affects the coverage, range, and performance of the diffused light (fill-in lighting) 1403. In some implementations, the light receiver panel 301 may be constructed to have a length of about 100 mm-152 mm and a width of about 50 mm-75 mm. In another implementation, materials used to fabricate the optical components in the optical lighting accessory may include but not limited to glass, plastics, polycarbonates, acrylics, fluorites or a variety of other transparent or semitransparent materials. In yet another implementation, materials used to fabricate the attachment or accessory case in the As used in the specification and the appended claims, the singular forms "a", "an", and "the" included plural referents unless the context clearly dictates otherwise.

All patents, patent applications, and other references cited herein are incorporated by reference in their entireties.

It is noted that the foregoing disclosure has been provided merely for the purpose of explanation and is in no way to be construed as limiting of the present invention. Although the present invention has been shown and described with respect to several preferred embodiments thereof, various changes, omissions, and additions to the form and detail thereof, may be made therein, without departing from the spirit and scope of the invention. It is understood that the words which have been used herein are words of description and illustration, rather than words of limitation. Changes may be made, within the purview of the appended claims, as presently stated and as amended, without departing from the scope and spirit of the present invention in its aspects.

Other embodiments and modifications of the present invention may occur to those of ordinary skill in the art in view of these teachings. Accordingly, the invention is to be limited only by the following claims which include all other such embodiments and modifications when viewed in conjunction with the above specifications and accompanying drawings.

What is claimed is:

1. An optical lighting accessory for use with a handheld mobile device having a front side, a backside, a front-facing camera located on the front side of the handheld mobile device, and a light source located on the backside of the handheld mobile device, the optical lighting accessory comprising:
   an optical element, the optical element configured to receive, capture and communicate a plurality of light rays emitted by the light source;
   a light receiver panel having a front surface, a back surface, a top portion, a base, a first side portion, and a second side portion, wherein the base is coupled to the optical element and configured to receive the plurality of light rays communicated by the optical element, wherein the front surface includes a diffuser layer for transforming the plurality of light rays into a diffused light, and the back surface includes a reflector layer for reflecting the plurality of light rays to the diffuser layer; and
   a first attachment member coupled to the first side portion and a second attachment member coupled to the second side portion, wherein the first and second attachment members are configured to receive and fasten to the handheld mobile device, and the diffuser layer is configured to provide the diffused light to the front-facing camera.

2. The optical lighting accessory of claim 1, wherein the optical element is structured to reflect the plurality of light rays by about 90 degrees.

3. The optical lighting accessory of claim 1, wherein the optical element is a prism or a mirror.

4. The optical lighting accessory of claim 1 further comprising a vanity mirror coupled to the reflector layer of the light receiver panel.

5. The optical lighting accessory of claim 1, wherein the handheld mobile device is a smartphone, a tablet, a laptop or a portable mobile computing device.

6. The optical lighting accessory of claim 1 further comprising a light intake element coupling the light receiver panel to the optical element.

7. The optical lighting accessory of claim 6, wherein the light intake element is an optical light pipe, an optical light guide, an optical light funnel, or a fiber optic cable.

8. The optical lighting accessory of claim 1, wherein the optical lighting accessory provides the diffused light to the front-facing camera when the handheld mobile device is in selfie mode.

9. The optical lighting accessory of claim 1, wherein the light receiver panel further includes a color filter layer for altering the plurality of light rays.

10. The optical lighting accessory of claim 1, wherein the light receiver panel further includes a plurality of reflective strips coupled to the top portion, a portion of the base, the first side portion, and the second side portion of the light receiver panel.

11. The optical lighting accessory of claim 1, wherein the light source includes an LED flash.

12. An optical lighting accessory for use with a handheld mobile device having a front side, a backside, a front-facing camera located on the front side of the handheld mobile device, and a light source located on the backside of the handheld mobile device, the optical lighting accessory comprising:
- an optical element, the optical element configured to receive, capture and communicate a plurality of light rays emitted by the light source;
- a light receiver panel having a front surface, a back surface, and a base, wherein the base is coupled to the optical element and configured to receive the plurality of light rays communicated by the optical element, wherein the front surface includes a diffuser layer for transforming the plurality of light rays into a diffused light, and the back surface includes a reflector layer for reflecting the plurality of light rays to the diffuser layer; and
- an accessory case configured to couple the optical element and the light receiver panel to the handheld mobile device, wherein the diffuser layer is configured to provide the diffused light to the front-facing camera.

13. The optical lighting accessory of claim 12, wherein the optical element is structured to reflect the plurality of light rays by about 90 degrees.

14. The optical lighting accessory of claim 12, wherein the optical element is a prism or a mirror.

15. The optical lighting accessory of claim 12, wherein the handheld mobile device is a smartphone, a tablet, a laptop or a portable mobile computing device.

16. The optical lighting accessory of claim 12 further comprising a light intake element coupling the light receiver panel to the optical element.

17. The optical lighting accessory of claim 16, wherein the light intake element is an optical light pipe, an optical light guide, an optical light funnel, or a fiber optic cable.

18. The optical lighting accessory of claim 12, wherein the optical lighting accessory provides the diffused light to the front-facing camera when the handheld mobile device is in selfie mode.

19. The optical lighting accessory of claim 12, wherein the light receiver panel further includes a color filter layer for altering the plurality of light rays.

20. The optical lighting accessory of claim 12, wherein the optical element and the light receiver panel is fastened to a retractable light panel carrier, the accessory case comprising a plurality support edges in which the retractable light panel carrier is inserted and freely slides.

* * * * *